United States Patent [19]

Resch

[11] Patent Number: 5,015,043

[45] Date of Patent: May 14, 1991

[54] DRIVE-SLIP CONTROL DEVICE (ASR) ON A ROAD VEHICLE ALSO EQUIPPED WITH AN ANTI-LOCK SYSTEM (ABS)

[75] Inventor: Reinhard Resch, Stuttgart, Fed. Rep. of Germany

[73] Assignee: Daimler-Benz AG, Fed. Rep. of Germany

[21] Appl. No.: 457,294

[22] Filed: Dec. 26, 1989

[30] Foreign Application Priority Data

Jan. 13, 1989 [DE] Fed. Rep. of Germany ....... 3900851

[51] Int. Cl.[5] ................... B60T 8/34; B60T 8/48; B60T 8/44
[52] U.S. Cl. .................................. 303/100; 180/197; 303/10; 303/92; 303/110; 303/116; 303/119; 303/DIG. 3
[58] Field of Search ............... 303/110, 119, 113, 114, 303/116, 92, 100, 10, 50, 52, DIG. 3, DIG. 4; 180/197; 60/547.1, 545; 188/345, 151 A, 1.11, 181 C

[56] References Cited

U.S. PATENT DOCUMENTS

| 4,804,236 | 2/1989 | Burgdorf et al. ................ 303/92 X |
| 4,861,118 | 8/1989 | Burckhardt et al. ............ 303/119 X |
| 4,940,293 | 7/1990 | Burckhardt et al. ............ 180/197 X |

FOREIGN PATENT DOCUMENTS

| 3627809 | 2/1988 | Fed. Rep. of Germany . |
| 3802133 | 8/1989 | Fed. Rep. of Germany . |
| 2194010 | 2/1988 | United Kingdom . |
| 2214253 | 8/1989 | United Kingdom . |
| 2214254 | 8/1989 | United Kingdom . |
| 2224323 | 5/1990 | United Kingdom . |

Primary Examiner—Douglas C. Butler
Attorney, Agent, or Firm—Evenson, Wands, Edwards, Lenahan & McKeown

[57] ABSTRACT

A drive-slip braking control device (ASR) for a road vehicle equipped with an anti-lock system (ABS) and having a hydraulic dual-circuit brake system, in which, on the brake circuit (II) of the driven vehicle wheels, the ABS works on the return-flow principle and the ASR on the principle of decelerating a vehicle wheel tending to spin by subjecting its wheel brake to pressure from an auxiliary-pressure source. A return pump of the ABS (assigned to the brake circuit of the driven vehicle wheels) is utilized as an auxiliary-pressure source for the drive-slip control mode. The brake unit can be shut off from the main brake line of the brake circuit of the driven vehicle wheels by an ASR control valve. The brake fluid supply flow path leading from the brake-fluid reservoir of the brake system to the inlet side of the return pump of the brake circuit of the driven wheel is one of the compensating flow paths of the brake unit. An inflow control valve is connected between the inlet side of the return pump and the delivery outlet of the brake unit for feeding brake fluid to the return pump in the ASR mode. The inflow control valve can be changed over from its shutoff position assigned to the braking mode into a throughflow position assigned to the drive-slip control mode. A leak detector mechanism is also included.

19 Claims, 3 Drawing Sheets

DRIVE-SLIP CONTROL DEVICE (ASR) ON A ROAD VEHICLE ALSO EQUIPPED WITH AN ANTI-LOCK SYSTEM (ABS)

BACKGROUND AND SUMMARY OF THE INVENTION

The invention relates to a drive-slip control device (ASR) for a road vehicle brake system equipped with an anti-lock system (ABS) and having a hydraulic dual-circuit brake system. One brake circuit is assigned to the driven vehicle wheels and the other brake circuit to the non-driven vehicle wheels and the two brake circuits are designed as static brake circuits, each of which is assigned to an outlet-pressure space of a brake unit provided for brake actuation. The brake system operates in accordance with the following:

At least on the brake circuit of the driven vehicle wheels, the ABS works on the return-flow principle during pressure-reduction phases of the anti-lock control, to return a quantity of brake fluid (corresponding to that quantity of brake fluid flowing off from the wheel brake(s) undergoing the control) into a return line connected to a buffer accumulator for pumping back into the brake unit by a return pump which has its inlet side connected to the buffer accumulator and its outlet side to the brake unit;

Wherein the ASR works on the principle of decelerating a vehicle wheel tending to spin by subjecting its wheel brake to pressure from an auxiliary-pressure source such that its drive slip remains within a value range compatible with a sufficient dynamic stability of the vehicle;

Wherein during drive-slip control mode, the return pump of the ABS assigned to the brake circuit of the driven vehicle wheels is utilized as an auxiliary-pressure source from which pressure is supplied to the wheel brake(s) in pressure build-up phases;

Wherein there is an ASR control valve which can be changed over from a basic normal braking mode position in which brake fluid can be positively displaced into the wheel-brake cylinders of the brakes of the driven vehicle wheels as a result of the actuation of the brake unit, into an alternative functional position, in which brake fluid is prevented from flowing off from the main brake line of the brake circuit of the driven vehicle wheels towards the respective outlet-pressure space of the brake unit.

An ASR of this general type is the subject of the applicant's own older published Patent Application U.S. Ser. No. P 3802 133.1-21 which describes (in combination with an ABS working on the known return-flow principle), an ASR which works on the principle of decelerating a driven vehicle wheel tending to spin by subjecting its wheel brake to pressure. There the return pump of the ABS assigned to the brake circuit of the driven vehicle wheels is utilized as an auxiliary-pressure source for the ASR. This return pump is conventionally designed as a free-piston pump and is fed via a precharging pump in the ASR control mode. The precharging pump feeds brake fluid from the brake-fluid reservoir of the brake system to the return line of the ABS via an outlet non-return valve generating brake pressure during the ASR mode. The return pump conveys brake fluid into the main brake line which is shut-off from the brake unit by means of an ASR control valve during drive-slip control. Furthermore, there is an ASR outlet valve which is connected between the return line of the brake circuit of the driven vehicle wheels and the brake-fluid reservoir. The basic position of this ASR outlet valve is its shut-off position and it is moved into its throughflow position only in pressure-reduction phases of the ASR to allow brake fluid to flow off from the return line towards the brake-fluid reservoir.

This return line is pressureless in the normal braking mode (braking not undergoing a brake-pressure control). Consequently, a leak in the admission-pressure supply path, leading via the return line of the return pump utilized for the drive-slip control (for example a leak of the outlet non-return valve of the precharging pump or a leak of the ASR outlet valve) cannot be detected in the normal braking mode.

However, if such a leak is present and the front-axle brake circuit fails during a braking operation, then when the ABS acts on the rear-axle driven wheel brake circuit during this braking operation the brake circuit can empty via the leak. Hence both brake circuits will fail. This complete failure of the brake system remains permanent. This potential danger that a failure of the front-axle brake circuit will cause the rear-axle brake circuit to also fail, if there is a leak in the return-pump supply circuit, is naturally unacceptable.

This problem does not arise in a brake system known with an anti-lock and drive slip control from DE 3,627,809 A1. There the ABS works on a return-flow principle modified to the effect that as soon as the anti-lock control responds, the return pumps assigned to the individual brake circuits not only pumps the quantity of brake fluid responding to that bled from the wheel brakes back into the outlet-pressure spaces of the master cylinder, but additionally pumps such a quantity of brake fluid out of the reservoir into outlet-pressure spaces of the brake unit so that the master-cylinder pistons are pushed back to their basic positions which correspond to the non-actuated state of the brake system. There central valves integrated in the master-cylinder pistons then act as brake valves, via which the brake circuits are now opened towards the reservoir to such an extent that the dynamically established brake pressure caused by the opening state of these valves and the delivery capacity of the pumps is proportional to the pedal force with which the driver actuates the brake pedal. This prevents the supply of brake fluid in the master-cylinder outlet pressure space (of the particular brake circuit undergoing anti-lock control) from being exhausted with a consequent failure of the brake circuit. However, there is disadvantage in that whenever the anti-lock control responds, a very uncomfortable pedal reaction occurs. In particular, a sudden jolt-like pushing of the brake pedal back to its initial position at the onset of the control occurs and as a result thereof, a hard brake pedal feeling lasts as long as the control lasts. Additional special construction of the central valves also has to be provided, since in this further known brake system, these valves must be capable of opening reliably within a short travel under extreme conditions corresponding to the maximum selectable brake pressure. A value design suitable for this purpose requires that the valve bodies and valve seats of the central valves have smooth metallic sealing faces, in contrast to conventional central valves having elastomeric sealing faces on the seats and/or the valve bodies. This of course involves considerable additional outlay in terms of both manufacturing accuracy and the need for additional filter elements to ensure that the sealing metal faces cannot be soiled. This is true since with valve having metal sealing faces (both on the seat and on the valve body) even the smallest dirt particles are sufficient to prevent a sealed closing.

The object of the instant invention is to therefore provide a comparatively simply designed ASR of the type mentioned and to the effect that even when a leak is present in the inlet circuit of the return pump of the brake circuit of the driven vehicle wheels (which is utilized as a pressure source for the drive-slip control) and when the brake circuit of the non-driven vehicle wheels fails during a braking operation, there is nevertheless sufficient safety against a failure of the brake circuit of the driven vehicle wheels.

According to the invention, this object is achieved by having a supply flow path lead from a brake-fluid reservoir of the brake unit through a piston of the brake unit and a delivery outlet of the pressure space of the brake unit to the inlet of the return pump. An inflow control valve is connected between the delivery outlet and the inlet of the return pump of the brake circuit of the driven vehicle wheels and is changed over from its shut-off basic position assigned to the braking mode to its throughflow position assigned to the ASR mode for the duration of control cycles of the drive-slip control.

Because the supply flow bath (by which brake fluid can be fed to the return pump from the brake-fluid reservoir of the brake system) has a compensating flow path which is open in the non-actuated state of the brake unit to an outlet-pressure space of the brake unit, and because it can be shut-off by means of an inflow control valve which is connected between the outlet of the brake unit and the return pump during the braking mode, and because it is only switched to its throughflow position in the drive-slip control mode, this will prevent the possibility that the brake will empty towards the brake-fluid reservoir (in the event of a response of the anti-lock control on the brake circuit of the driven vehicle wheels). This is true since there is no flow path which leads directly back to the brake-fluid reservoir of the brake system. If, on the other hand, the inflow control valve leaks during normal braking, this can be detected from a lengthening of the pedal travel, since even during normal braking, the buffer accumulator of the rear-axle brake circuit has to be filled before there can be an appreciable brake-pressure build-up in the brake circuit of the driven vehicle wheels. Thus, in practice, this guarantees increased safety because a leak of the inflow control valve is detectable.

With a design of the inflow control valve as an electrically activated 2/2-way solenoid valve, this valve can be actuated at the same time as the activation of the precharging pump and of the return pump of the brake circuit of the driven vehicle wheels in response to an output signal from the electronic ABS and ASR control unit.

Instead of an electrically activatable inflow control valve, one can use a mechanically controlled valve which can be actuated directly by means of the brake pedal to be changed over from its throughflow drive-slip control basic position to its shut-off functional position assigned to the braking mode.

This change over can occur if displacement of the piston (which movably limits that outlet-pressure space of the brake unit assigned to the brake circuit of the driven vehicle wheels) actuates the valve and if this change-over takes place within a small fraction of the possible total stroke of the brake-unit piston, it affords a constructively favorable possibility of integrating the inflow control valve into the brake unit. A substantial advantage in replacing a solenoid valve with a mechanically activatable valve is to be seen in the essentially simpler design of such a valve and also in a price benefit resulting from this change.

If two electrically actuated 2/2-way solenoid outlet valves are inserted into the return line of the hydraulic unit of the ABS and ASR to control brake fluid flow-off from one or both wheel brakes of the brake circuit of the driven vehicle wheels, during pressure-reduction phases of the anti-lock control, an individual anti-lock control on the two driven vehicle wheels is possible. Hence brake pressure can be reduced on one wheel brake and brake pressure built up on the other wheel brake. Also a coupled drive-slip control is possible, when brake pressure is built up on one wheel brake and in the other wheel the brake pressure is at most maintained, but cannot be reduced.

The manner of inserting the outlet valves of the wheel brakes of the driven vehicle wheels is provided by having one outlet valve of the two outlet valves shut-off the wheel brake of one the driven vehicle wheels from the another and from the return line of their brake circuit during drive-slip control. This valve can thus connect the wheel brakes to one another at least in the anti-lock control mode. The other outlet valve is position to jointly shut-off or connect the return line to both wheel brakes.

However, it is possible, to use a hydraulically activatable outlet control valve, which is activatable hydraulically by means of the pressure built up during the actuation of the brake unit in the secondary outlet pressure space assigned to the brake circuit of the driven vehicle wheels, and which is changed over from its shut-off basic position into its throughflow position by means of this pressure. This construction is suitable for a common anti-lock control of the two wheel brakes, in which brake pressure is built up, held, or reduced in phase on both vehicle wheels. The drive-slip control is coupled in such a way that whenever the brake pressure on one of the wheel brakes of the driven vehicle wheels is changed, the brake pressure on the other wheel can either be changed in the same direction or be maintained.

However, it is possible, to use a hydraulically activatable outlet control valve, which is activatable hydraulically by means of the pressure built up during the actuation of the brake unit in the secondary outlet pressure space assigned to the brake circuit of the driven vehicle wheels and which is changed over from its shut-off basic position into its throughflow position by means of this pressure instead of solenoid actuated outlet valve to make the connection between the wheel brakes. This construction markedly reduces the technical outlay required for the ASR control.

One could alternatively have the outlet valve designed as a mechanically activatable 2/2-way valve to make the connection between the wheel brakes of the brake circuit of the driven vehicle wheels. This valve can be changed over from the shut-off basic drive-slip control position into throughflow braking bode position as a result of the pressure build-up displacement occurring whenever the brake unit is actuated. Here the brake-unit piston which movably limits the secondary outlet-pressure space of the brake unit assigned to the brake circuit of the driven vehicle wheels mechanically actuates the outlet control valve with the change-over taking place within a small fraction of the possible total stroke of the brake-unit piston.

Alternatively to this, the outlet pressure of the precharging pump could cause activation of the outlet valve making the connection between the wheel brakes. Here the basic position is the throughflow position and the functional position assigned to the drive-slip control mode is the shut-off position.

The precharging pump could be a gear pump to convey brake fluid out of the brake-fluid reservoir of the brake system to the pump chamber of the return pump of the brake circuit of the driven vehicle wheels. Since the leakage rate at standstill is very high, a control slide, activated by means of the outlet pressure of the pre-charging pump, is provided for actuating the outlet valve and the pressure relieved sufficiently quickly so that the ASR can respond quickly on a wheel brake otherwise shut-off.

A marked simplification of the hydraulic unit of the ASR is achieved by means of a precharging pump which is constructed as a further piston pump which can be driven by means of the pump drive provided for the return pump. Utilizing the design with a self-priming pump is advantageous if the precharging pump is equipped with a displacement controlled inlet valve which is moved into its open position while the pump piston is executing the final portion of its suction stroke and the initial portion of its delivery stroke and which is otherwise shut-off. This results in an especially low inlet flow resistance.

This is also true when the return pump of the brake circuit of the driven vehicle wheels is designed as a self-priming pump, since then there is no need for a precharging pump for the return pump to act as an auxiliary-pressure source of the ASR.

Alternatively to an insertion of the ASR control valve between the brake unit and the main brake line of the brake circuit of the driven vehicle wheels, it is also possible to insert the ASR control valve into the ABS and ASR hydraulic unit between the brake-fluid reservoir and the brake unit.

It is advantageous if fault detection device is provided to generate an indicator signal characteristic of the proper functioning or malfunctioning of the brake system as a result of a comparing a first sensor output signal (which is a measure of the displacement of the piston of a brake unit occurring as a result of an actuation of the brake system) with a second sensor output signal (which is a measure of the brake-actuating force arising as a result of the actuation). The second sensor output signal is generated by a pressure sensor which monitors the brake pressure occurring in the brake circuit of the driven vehicle wheels. If the brake unit is designed as a tandem master cylinder, then the fault detection device could comprise two displacement sensors, each monitoring the position of one of the two pistons of the tandem master cylinder and generating electrical output signals characteristic of the piston positions. Comparison of these signals would generate indicator or warning signals characteristic of the proper functioning or malfunctioning of the brake system.

Other objects, advantages and novel features of the present invention will become apparent from the following detailed description of the invention when considered in conjunction with the accompanying drawings.

DETAILED DESCRIPTION OF THE DRAWINGS

Figure 1:
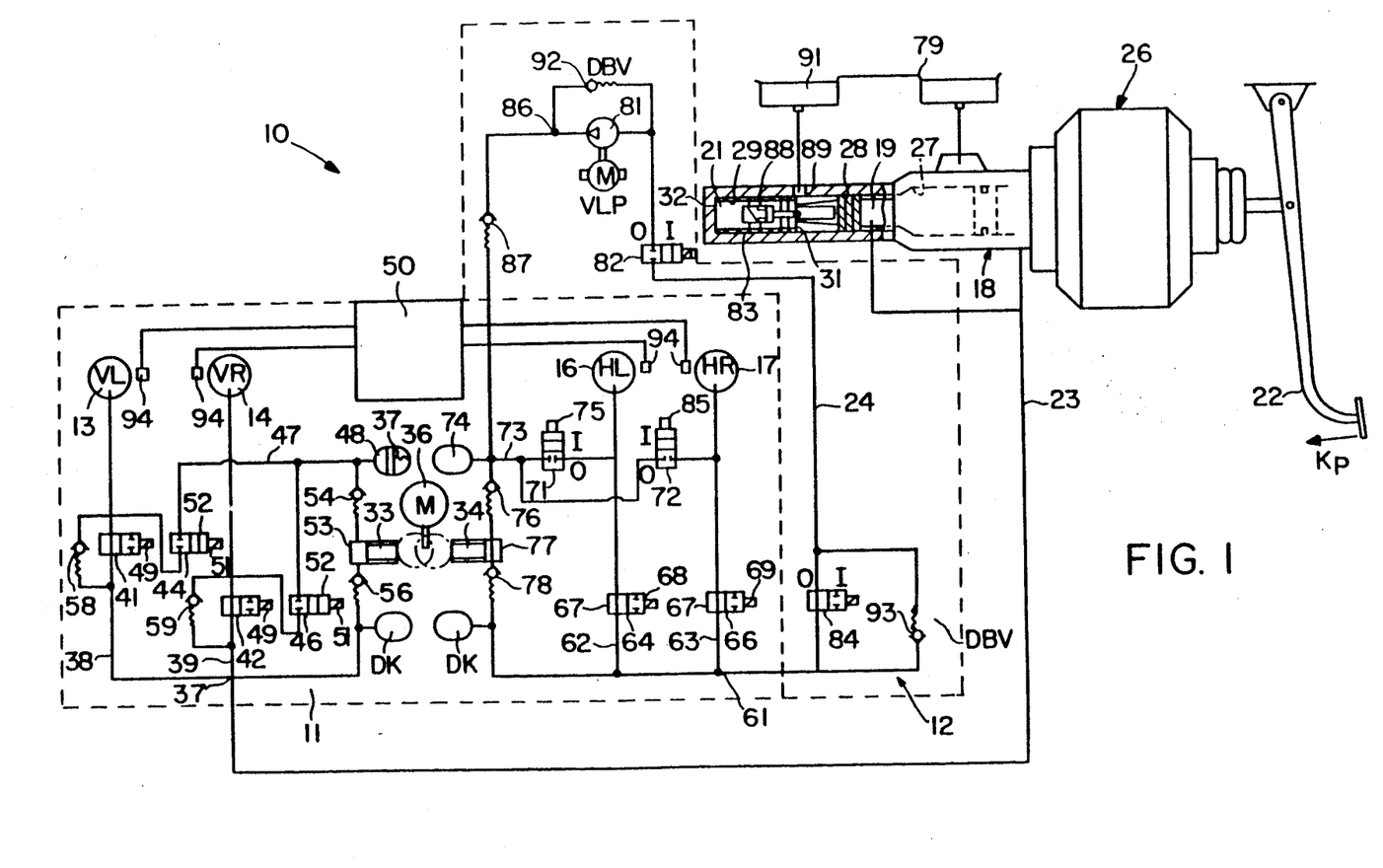
FIG. 1 shows a preferred exemplary embodiment of a drive-slip control device according to the invention, with solenoid actuated ASR control, inflow control, brake-pressure inlet and brake-pressure outlet valves.

The hydraulic dual-circuit brake system 10 is for a road vehicle which is equipped both with an anti-lock (ABS) 11 and a drive-slip control (ASR) 12.

For descriptive purposes the vehicle is assumed to have a rear-axle drive (not shown for the sake of simplicity). The output torque of the vehicle engine is distributed to two rear wheels of the vehicle via a rear axle differential gear (not shown). The wheel brakes 13 and 14 of the left and right front wheels of a vehicle are combined to form a front-axle brake circuit 1 and the wheel brakes 16 and 17 of the left and right rear wheels of a vehicle are combined to form a rear-axle brake circuit II.

The two brake circuits I and II are designed as static brake circuits. A brake unit 18 for supplying brake pressure is designed as a stepped tandem master cylinder of a known type (Alfred Teves GmbH, Brake Manual, 9th edition, 1986, page 73, Bartsch Verlag Ottobrunn bei Munchen) and has two outlet-pressure spaces 19, 21 which are each assigned to one of the two brake circuits I and II. The driver actuates a brake pedal 22 by a force $K_P$ to statically build up the front-axle brake pressure $P_{VA}$ and the rear-axle pressure $P_{HA}$ in proportion to the force $K_P$. These Pressures are fed via respective main brake line 23, 24 into their wheel brakes 13, 14 and 16, 17 of the front-axle brake circuit I and of the rear-axle brake circuit II.

The brake unit 18 also possesses a pneumatic or hydraulic brake booster 26.

The front-axle brake circuit I is connected to the primary outlet-pressure space 19 and the rear-axle brake circuit II to the secondary outlet-pressure space of the tandem master cylinder 18. The primary outlet-pressure space 19 is fixedly limited relative to the housing by the larger bore step 27 of the master-cylinder housing 28 and axially movably both by a primary piston (not shown and which is guided displaceably in a pressure-tight manner in this larger bore step 27 on which the boosted pedal force acts) and by the secondary piston 31 of the tandem master cylinder 18. The secondary piston 31, is designed as a floating piston which is displaceably guided in a pressure-tight manner in the spacially smaller bore step 29 of the master-cylinder housing 28. The secondary outlet-pressure space 21 is movably limited by the secondary piston 31 and is fixed relative to the housing by the end wall 32 of the master-cylinder housing 28.

Both on the front-axle brake circuit I and on the rear-axle brake circuit II, the ABS 11 works on the so-called return-flow principle, wherein during brake-pressure reduction phases of the anti-lock control, brake fluid is bled from one of the wheel brakes 13 and/or 14 and 16 and/or 17 and is pumped back into that outlet-pressure space 19 or 21 of the master cylinder 18, assigned to the particular brake circuit I or II.

A return piston pump 33, 34 is provided for each of the two brake circuits I and II to provide this flow return and has a common electrically activatable pump eccentric drive 36.

Two brake-line brakes 38 and 39 extend from a branching point 37 of the main brake line 23 of the front-axle brake circuit I. During normal braking (braking not undergoing an anti-lock control), brake pressure is fed into the wheel brakes 13 and 14 of the front-axle brake circuit I through inlet valves 41, 42 in the branch brake lines 38 and 39. As long as the ABS 11 has not responded on the front axle, valves 41 and 42 take their illustrated basic throughflow positions 0, in which the wheel-brake cylinders of the front-wheel brakes 13 and 14 are connected to the main brake line 23 of the front-axle brake circuit I via a throughflow path 43 of the respective inlet valves(s) 41, 42. Thus brake pressure can be both built up and reduced as a result of an appropriate actuation of the brake unit 18 in the basic throughflow positions 0 of these inlet valves 41 and 42.

Furthermore, the wheel-brake cylinders of the front-wheel brakes 13 and 14 are each connected via an outlet valve 44, 46 to a return line 47 leading to a low-pressure buffer accumulator 48. This accumulator (in pressure-reduction phases of the anti-lock control) allows a rapid relief of pressure before the return pump 33 can convey the bled-off brake fluid into the brake unit.

The outlet valves 44 and 46 of the front-axle brake circuit I assume a basic shut-off positions 0, as long as the ABS on the front axle has not responded. Here the particular front-wheel brake(s) 13 or 14 is shut-off from the return line 47 of the front-axle brake circuit I.

In the embodiment illustrated, the inlet valves 41 and 42 of the front-axle brake circuit I are designed as 2/2-way solenoid valves, which have their switching magnets 49 activated by an output signal from an electronic control unit 50 provided both for the functional control of the ABS 11 and for the functional control of the ASR 12 as will be explained hereafter. There inlet valves 41 and 42 can be moved individually or jointly (depending on whether the control is to take effect on only one or on both front wheels) into their energized shut-off position I, in which the particular wheel brake(s) 13 and/or 14 of the front-axle brake circuit I undergoing the control is shut off from its main brake line 23.

In the embodiment illustrated, the outlet valves 44 and 46 are also designed as 2/2-way solenoid valves that are energized by control magnets 51 by means of a control output signal from the electronic control unit 50. These outlet valves 44 and 46 can be moved individually or jointly (depending on the particular front-wheel brake 13 and/or 14 on which the ABS 11 responds) out of their basic shut-off position 0 into their energized throughflow position I in which the respective wheel brake(s) 13 and/or 14 undergoing a brake-pressure reduction control is connected to the return line 47 of the front-axle brake circuit I via the throughflow path 52 of the respective outlet valve 44, 46.

The return pump 33 of the front-axle brake circuit I is activated together with the return pump 34 of the rear-axle brake circuit II in the event of a response of the ABS 11. The pump chamber 53 of return pump 33 is connected to the return line 47 via an inlet non-return valve 54 and to the main brake line 23 via an outlet non-return valve 56. The inlet non-return valve 54 is subjected (in the opening direction) to a relatively higher pressure in the return line 47 (or in the low-pressure accumulator 48 connected to this line) than in the pump chamber 53 and is held in its shut-off position by a relatively higher pressure in the pump chamber 53 than in the return line 47 or the low-pressure accumulator 48. The outlet non-return valve 56 of the return pump 33 of the front-axle brake circuit I is subjected (in the opening direction) to a relatively higher pressure in the pump chamber 53 of this return pump 33 than in the main brake line 23 and is held in its shut-off position by a relatively higher pressure in the main brake line 23 than in the pump chamber 53.

The low-pressure accumulator 48 is designed as piston-spring accumulator such that the prestress of its accumulator spring 57 is equivalent to a high accumulator pressure of, for example 4 to 6 bars. When the holding capacity of the low-pressure accumulator 48 is fully utilized, it is equivalent to a pressure of approximately 10 bars.

Whenever the ABS 11 responds, its two return pumps 33 and 34 are activated for the entire duration of the particular control cycle. A decoupled single-wheel control is possible on the front axle of the vehicle by means of actuation of one set of the inlet valve 41 and 42 and the outlet valves 44 and 46 of the front-wheel brakes 13 and 14. Thus brake-pressure reduction, brake-pressure holding and brake-pressure rebuild-up phases can be obtained independently of one another on the two front-wheel brakes 13 and 14.

In order to obtain a brake-pressure reduction phase (for example on the left front-wheel brake 13) the inlet valve 41 is moved into its energized shut-off position I, and outlet valve 44 is likewise moved into its energized throughflow position I.

To obtain a brake-pressure holding phase for maintaining the duration of the brake pressure in the wheel-brake cylinder of the front-wheel brake 13, the inlet valve 41 is held in its energized shut-off position I and the outlet valve 44 in its basic shut-off position 0.

Brake-pressure build-up phases in the front wheel brake 13 are achieved by moving the inlet valve 41 and the outlet valve 44 into their basic positions 0 which are also assigned to the normal braking mode (a braking mode not undergoing a control).

The same basic positions 0 of inlet valve 42 and outlet valve 46 applies to brake pressure buildup control phases on the right front-wheel brake 14.

The above ABS 11 front axle control corresponds in terms of construction and functioning to known anti-lock ABS braking systems working on the return-flow principle.

It goes without saying that instead of the two inlet and outlet valve 41, 44 and 42, 46 for each of the two front-wheel brakes 13 and 14 there could be a 3/3-way solenoid valve, (not shown). This valve would have a basic throughflow position 0 in which the respective wheel brake 13 or 14 is connected to the main brake line 23 of the front-axle brake circuit and is shut off from the return line for brake pressure application. The 3/3-way valve would have a first energized shut-off position, wherein the respective wheel brake 13 or 14 is shut-off both from the main brake line 23 of the front-axle brake circuit I and from its return line 47 for a brake pressure maintenance applications and a second energized position, wherein the respective wheel brake 13 or 14 is connected to the return line 47 of the front-axle brake circuit I and is shut-off from its main brake line 23 for a brake pressure reduction application.

The non-return valves 58 and 59, which are provided in a parallel connection with the inlet valve 41 and 42 of the two front-wheel brakes 13 and 14 and which are subject in the opening direction to a relatively higher pressure in the particular front-wheel brake 13 or 14 than in the main brake line 23, have as their purpose the allowing of a rapid reduction of brake pressure during easing of the pedal-actuating force.

The hydraulic functional part of the ABS 11 provided for the anti-lock control on the rear-wheel brakes 16 and 17 is similar in terms of construction and mode of operation as the brake-pressure control on the front-wheel brakes 13 and 14.

In the rear-axle brake circuit II, the brakeline branches 62 and 63 extend from a branching point 61 of the main brake line 24 of the rear-axle brake circuit II. Whenever the rear-wheel brakes 16 and 17 are to be manually activated, as well as in response to the drive-slip control 12, brake pressure is fed into the wheel brakes 16 and 17 of the rear-axle brake circuit II via 2/2-way solenoid inlet valves 64, 66. The inlet valves 64 and 66 have an illustrated basic throughflow positions 0 in which the rear-wheel brakes 16 and 17 are connected to the main brake line 24 of the rear-axle brake circuit II via throughflow paths 67 in the two valves. The inlet valves 64 and 66 of the rear-axle brake circuit II can be moved into their energized shut-off position I, individually or jointly depending on the particular vehicle wheel on which the respective control is to take effect. The inlet valves 64 and 66 are energized by control magnets 68 and 69 in response to output signals from the electronic control unit 50 provided both for the functional control of the ABS 11 and for that of the ASR 12. Moreover, the wheel-brake cylinders (not shown) of the rear-wheel brakes 16 and 17 are also connected via a respective outlet valve 71, 72 to a return line 73 of the rear-axle brake circuit II. In the event of a response of the anti-lock ASR system on the rear axle (brake-pressure reduction phases of the anti-lock control), brake fluid can flow off towards the low-pressure buffer accumulator 74 of the rear-axle brake circuit II towards its return pump 34.

The buffer accumulator 74 is connected via an inlet non-return valve 76 (corresponding in functional terms to the inlet non-return valve 54 of the return pump 33 of the front-axle brake circuit I) to the pump chamber 77 of the return pumP 34 or the rear-axle brake circuit II. The return pump 34 is connected to the main brake line 24 of the rear-axle brake circuit II via the outlet non-return valve 78 (corresponding in functional terms to the outlet non-return valve 56 of the return pump 33 of the front-axle brake circuit I).

The outlet valves 71 and 72 of the rear-axle brake circuit II, are designed as 2/2-way solenoid valves which can be changed over individually or jointly into their respective energized throughflow position I, as a result of the energization of their control magnets 75 and 85 by means of output signals from the electronic control unit 50. Combinations of shut-off and/or throughflow positions of the inlet and outlet valve 64, 71 and 66, 72 (utilized for brake pressure reduction, brake-pressure holding and brake-pressure rebuild-up phases of the anti-lock control) are the same as in an anti-lock control on the front-wheel brakes 13 and 14.

The functional components of the ABS 11 explained thus far essentially in relation to the anti-lock control on the wheel brakes 16 and 17 of the driven vehicle wheels are also utilized for the drive-slip control (ASR). The ASR works on the principle of decelerating a vehicle wheel tending to spin by activating its wheel brake 16 or 17 until its drive slip remains within a value range compatible both with good propulsive acceleration and with sufficient driving stability.

The return pump 34 of the ABS 11, assigned to the rear-axle brake circuit II is utilized as an auxiliary-pressure source from which brake pressure is supplied to the wheel brake 16 or 17 of the particular vehicle wheel tending to spin during ASR control. The outlet pressure of pump 34 is fed via the respective inlet valve 64, 66 into the left and/or the right rear-wheel brake 16 and/or 17.

A self-priming electrically driven precharging pump 81 is provided so that brake fluid can be fed from the pressureless brake-fluid reservoir 79 of the brake system 10 (counter to the closing force of the inlet non-return valve 76 of the return pump 34 of the rear-axle brake circuit II) into the pump chamber 77 of the said return pump 34 in the drive-slip ASR control mode. The precharging pump 81 is connected between the brake unit 18 and the inlet non-return valve 76 of the buffer accumulator 74 and return pump 34 of the rear-axle brake circuit II. The precharging pump 81 is connected on its inlet side to that outlet 83 of the brake unit 18 assigned to the rear-axle brake circuit II via an inflow 2/2-way solenoid control valve 82. The secondary outlet-pressure space 21 of the brake unit 18 is connected to the main brake line 24 of the rear-axle brake circuit I branching off to the inlet valves 64 and 66 of the rear-wheel brakes 16 and 17 via an ASR 2/2-way solenoid control valve 84.

The delivery outlet 86 of the precharging pump 81 is connected to the lower-pressure accumulator 74 and inlet non-return valve 76 of the return pump 34 of the rear-axle brake circuit II via an outlet non-return valve 87. This outlet non-return valve 87 is subjected (in the opening direction) to a relatively higher pressure at the outlet 86 of the precharging pump 81 than in the buffer accumulator 74.

The basic throughflow position 0 of the ASR control valve 84 is the normal braking mode (braking mode not undergoing a control) in which, whenever the brake unit 18 is actuated, brake pressure generated in its secondary outlet-pressure space 21 can be fed into the main brake line 24 of the rear-axle brake circuit II. The ASR control valve 84 can be moved into its energized shut-off position I in which the main brake line 24 of the rear-axle brake circuit II is shut off from that outlet 83 of the brake unit 18 by means of an output signal from the electronic ABS and ASR control unit 50.

The inflow control valve 82 of the precharging pump 81 can be moved from its basic position 0 into its throughflow position I at the same time as the precharging pump 81 is activated and for the duration of control cycles of the ASR 12. Here the inlet side of the precharging pump 81 is then connected to the secondary outlet-pressure space 21 of the brake unit 18, which is put in communicating connection, via a central valve 88 of the secondary piston 31 during the non-actuated state of the brake unit. The central valve 86 is connected via follow-up space 89 with chamber 91 of the brake-fluid reservoir 79 assigned to the rear-axle brake circuit II so that the precharging pump 81 can suck up brake fluid from the brake-fluid reservoir 79 via the brake unit 18 and convey it to the return pump 34 of the rear-axle brake circuit II.

It goes without saying that the throughflow cross-section of the central valve 88 shuts off the compensating flow path leading from the follow-up space 89 to the secondary outlet-pressure space 21, after a small initial portion of the brake-pressure build-up stroke of the secondary piston 31 occurs when the brake unit 18 is actuated. The flow path through valve 88 must be sufficiently large to ensure that under all operating conditions of the brake system 10 (especially also at relatively low temperatures when the viscosity of the brake fluid is increased), the latter can overflow to the precharging pump 81 in sufficient quantity.

The outlet pressure and delivery capacity of the precharging pump 81 are calculated sufficiently high to ensure that the stream of brake fluid from the precharging pump 81 or the buffer accumulator 74 to the return pump 34 cannot break away while the latter is working as a brake-pressure source in the drive-slip control mode.

The outlet-pressure level of the precharging pump 81 is limited by a pressure-limiting valve 92 which is represented as a non-return valve and which is connected in parallel with the precharging pump 81.

The ASR control valve 84 is moved to its shut-off position I for the duration of brake-pressure build-up phases of the drive-slip control. While a brake-pressure reduction phase of the drive-slip control is taking place on at least one of the rear-wheel brakes 16 and/or 17, the ASR control valve 84 is switched back into its throughflow position 0 assigned to the normal braking mode.

Since the return piston pump 34 of the rear-axle brake circuit II pump can generate an outlet pressure which can be substantially higher than the maximum pressure necessary for subjecting the rear-wheel brake or rear-wheel brakes 16 and/or 17 to a requisite brake pressure for the drive-slip control, a limitation of the outlet pressure of the return pump 34 is also necessary. A pressure-limiting non-return valve 93, provided for this purpose, is connected in parallel with the ASR control valve 84.

The functional explanation of the ASR 12 will assume a starting situation in which the drive-slip control begins on the right rear wheel. For example, this could occur because this right wheel is on an icy surface and therefore is more inclined to spin than the left rear wheel which may be on relatively dry road region of good grip.

As soon as a limit value of 30% of the drive slip of the right rear wheel is reached or exceeded (the drive slip $\lambda_A$ being given by the relation $$\lambda_A = V_R - V_F / V_R$$

in which $V_R$ denotes the wheel circumference speed of the vehicle wheel in question and $V_F$ denotes the vehicle speed or a reference speed approximately representing this) the inlet valve 64 of the left rear wheel brake 16 is changed over to its shut-off position I, the ASR control valve 84 to its shut-off position I and the inflow control valve 82 to its energized throughflow position I and, simultaneously with this change-over of the said valves 64, 84 and 82 (or with a slight delay in relation to this) the precharging pump 81 is cut in. Brake pressure is thereby fed into the right rear-wheel brake 17 via the open inlet valve 66. If the tendency of the right rear wheel to spin decreases as a result of braking, the inlet valve 66 is first changed over to its shut-off position I in order to maintain the brake pressure fed into the wheel brake 17 for a limited period of time. This change-over of the inlet valve 66 takes place even before the tendency of the rear wheel in question to spin has disappeared completely. That is, before the drive slip has fallen below a threshold value. Only after falling below the threshold can it be assumed that power can be transmitted to the vehicle via the vehicle wheel subjected to the control and at the same time guarantee driving stability.

If the tendency of this rear wheel to spin increases again, despite the brake pressure being kept constant, the inlet valve 66 of this wheel brake 17 is once again switched back into its throughflow position 0 and the brake pressure in the wheel brake 17 is thereby increased once more. If the tendency to spin of the right rear wheel in question thereafter disappears permanently, the electronic control unit 50 detects this condition from the fact that the drive slip $\lambda_A$ of this vehicle wheel falls below a lower limit value satisfying the criteria of good driving stability and a sufficient proportion transmission capacity. Consequently the brake pressure in the right rear-wheel brake 17 can be reduced and then the ASR control valve 84 is switched back into its throughflow position 0, and simultaneously with this (or if appropriate with a slight time delay in relation to this) the inlet valve 66, if it has previously been moved into its shut-off position I, is likewise switched back into its throughflow position 0. The valve 66 is now used as an outlet valve. Brake fluid can flow off from the rear-wheel brake 17 subjected to the control to the secondary outlet-pressure space 21 of the brake unit via the ASR control valve 84 (likewise used as an outlet valve) and from this, via the open central valve 88 and the follow-up space 89 of the brake unit 18, to that chamber 91 of the brake-fluid reservoir 79 assigned to the rear-axle brake circuit II.

The inlet valve 64 of the left rear-wheel brake 16 has been held in its shut-off position I from the start of the control to this moment.

If a tendency to spin now occurs on the left rear wheel of the vehicle while brake pressure is still being reduced on the right rear-wheel brake 17, then the ASR control valve 84 and the inlet valve 66 of the right rear-wheel brake are once more changed over to their energized shut-off positions I, while the inlet valve 64 of the left rear-wheel brake is switched back into its throughflow position 0. Now brake pressure is built up on the left rear-wheel brake 16 in order to combat the tendency of the left rear wheel to spin.

Thus, during the pressure build-up phase on the left rear-wheel brake 16, the brake pressure on the right rear-wheel brake 17 is maintained at the value obtained until then as a result of the pressure reduction. If a brake-pressure holding phase is subsequently executed on the left rear-wheel brake, this taking place as a result of the change-over of the inlet valve 64 into its shut-off position I, then brake pressure can be reduced again on the right rear-wheel brake 17 by a new change-over of the ASR control valve 84 to its throughflow position 0 and change-over of the inlet valve 66 of this rear-wheel brake 17 to its throughflow position 0.

The drive-slip control takes place in a coupled manner in such a way that brake-pressure changes on the two rear-wheel brakes 16 and 17 are possible only in the same direction. A brake-pressure increase or reduction is possible on one of the two brakes 16 or 17 only when the brake pressure on the other particular rear-wheel brakes 17 or 18 is maintained at its then value.

Finally, the control is ended by again switching all the valves (so far as they do not already assume their basic positions 0), back into their neutral-control basic positions provided for the normal braking mode.

The control signals necessary for the appropriate activation of the inlet valves 41, 42 and 64, 66, the outlet valves 44, 46 and 71, 72 of both the front-axle brake circuit I and the rear-axle brake circuit II, the ASR control valve 84, the inflow control valve 82, the return pumps 33 and 34 and the precharging pump 81 in the drive-slip control mode are obtained from the electronic control unit 50 provided jointly for the two ABS and ASR control systems. The control unit 50 processes output signals from wheel-speed sensors 94, which are each assigned individually to the non-driven and the driven vehicle wheels and which generate signals (according to level and or frequency) which are characteristic of the wheel circumference speed of the individual vehicle wheels and of which, with changes in time, also contain information on the acceleration and deceleration behavior of individual vehicle wheels.

An average person, skilled in the art and familiar with the conventional control algorithms of an anti-lock and a drive-slip control, will find it possible (on the basis of this knowledge and without inventive deliberation) to produce the electronic control unit 50 which ensures an appropriate activation of the above-explained functional elements of the ABS 11 and ASR 12. Therefore there is no need for this application to present a detailed explanation of the electronic control unit 50, especially an explanation which goes into the details of electronic circuit technology.

The same applies to the embodiments of FIG. 2 in which the ASR 12 works on the same principle of couple control as was explained with reference to the embodiment according to FIG. 1. Here the ABS 11 on the wheel brakes 16 and 17 of the driven vehicle wheels also works according to a coupled control, so that on the two rear-wheel brakes 16 and 17, the control works in-phase in such a way that the brake-pressure reduction, brake-pressure holding and brake-pressure rebuild-up phases of the anti-lock control take place respectively in the same direction on the rear-wheel brakes, in the manner of the select-low principle known per se.

Figure 2:
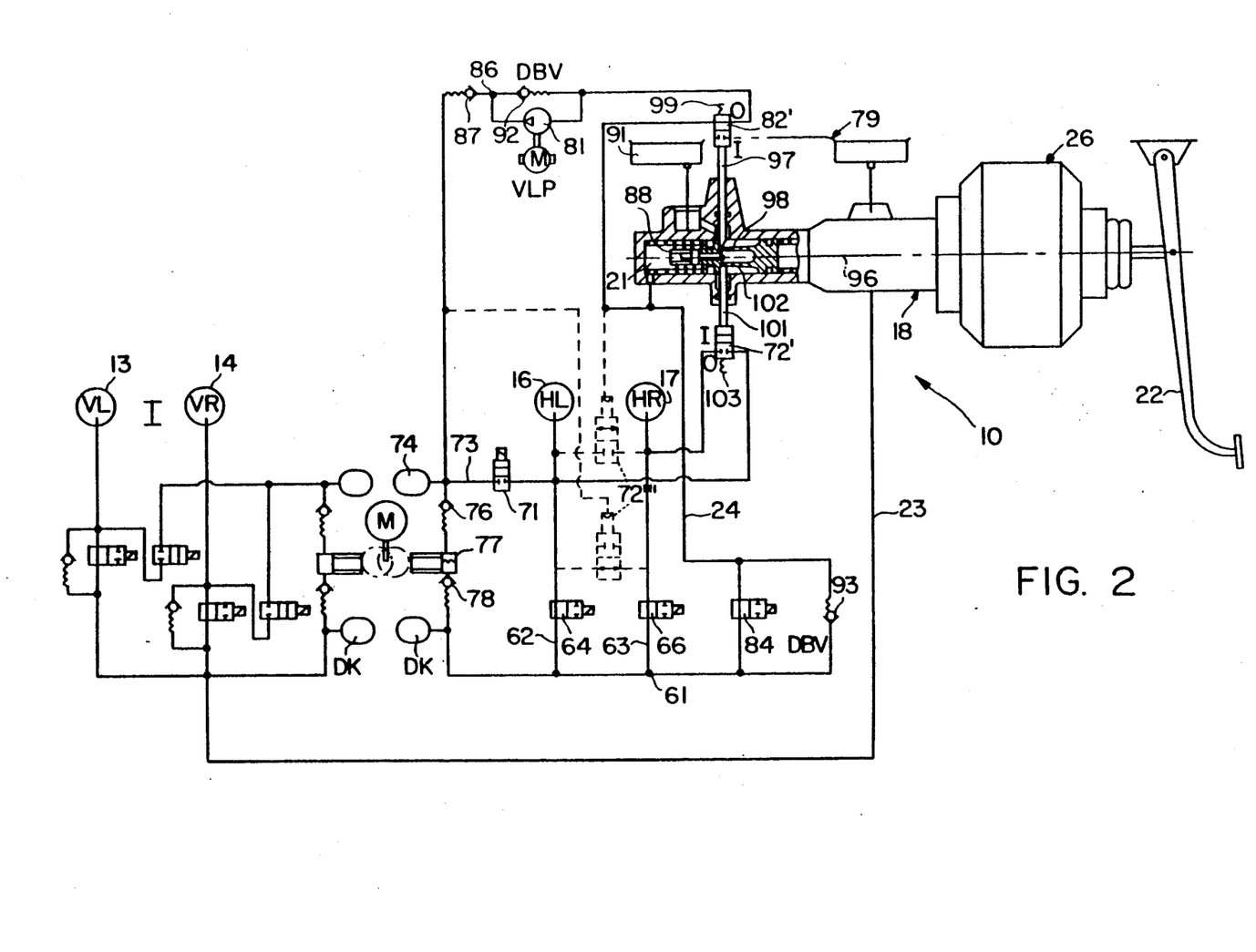
FIG. 2 shows an alternate embodiment with a mechanically or hydraulically activatable outlet valve and with a mechanically activatable inflow control valve.

In FIG. 2, the constructional and functional elements of the control devices, insofar as they are identical to, or constructionally or functionally equivalent to constructional and functional elements of the control devices explained with reference to FIG. 1, bear the same reference symbols as the corresponding elements of FIG. 1. Insofar as this occurs, without such identically designated elements being mentioned specifically, this is intended to point to the description of the identically designated constructional and functional elements which was given with reference to FIG. 1. These elements of FIG. 2, which are structurally different and functionally identical to FIG. 1 are denoted with a prime after the numeral.

For the sake of simplicity in representation, FIG. 2 omits a representation of the electronic control unit 50 and of the wheel-speed sensors 94 provided for monitoring the movement behavior of the vehicle wheels.

To avoid repetition, the following description of the further embodiments will be restricted to their differences from the particular exemplary embodiment described previously.

In FIG. 2, the inflow control valve 82' shuts off that outlet-pressure space 21 of the brake unit 18 assigned to the rear-axle brake circuit II from the precharging pump 81 in the normal braking mode and in a braking mode undergoing the anti-lock control and connects this outlet-pressure space 21 to the inlet side of the precharging pump 81 in the drive-slip control mode, is designed as a mechanically controlled 2/2-way valve which is changed over from its illustrated basic position 0, assigned to the braking mode, into its alternative functional shut-off position I when the driver actuates the brake unit 18. This inflow control valve 82' is actuable by means of a control tappet 97 which extends radially in relation to the central longitudinal axis 96 of the brake unit 18 and which is slidably supported on a first ramp-shaped control surface 98 of the secondary piston 31 of the brake unit 18 and is held against this control surface 98 by valve spring 99 of the inflow control valve 82'. As a result of a radial outward displacement of the control tappet 97 (which the latter experiences when the secondary piston 31 of the brake unit 18 undergoes a displacement in the direction of a brake-pressure build-up in the secondary outlet-pressure space 21 of the brake unit), the inflow control valve 82' is changed over to its functional position I alternative to the basic position 0. The function of this mechanically controlled inflow control valve 82 is therefore entirely similar to that of the electrically controllable inflow control valve 82' according to FIG. 1.

In the alternative embodiment according to FIG. 2, the ABS outlet valve 72' which allows brake fluid to flow away from one of the two rear-wheel brakes 16 or 17 in a pressure-reduction phase of the anti-lock control is designed as a mechanically activatable 2/2-way valve. Upon actuation of the brake unit 18, outlet valve 72' is changed over from its basic shut-off position 0 into its alternative energized throughflow functional position I. This ABS outlet valve 72' is actuated by means of a control tappet 101 which extends radially in relation to the central longitudinal axis of the brake unit 18 and which is slidably supported on a second ramp-shaped control surface 102 of the secondary piston 31 of the brake unit 18 and is held against the secondary piston 31 and its second ramp-shaped control surface 102.

In a further constructional difference from the exemplary embodiment according to FIG. 1, the ABS outlet valve 72' (assigned to the right rear wheel) is connected between the two rear-wheel brakes 16 and 17 or their wheel-brake cylinders (not shown), so that the outlet valve 72' is in its throughflow communicating connection position I between the brakes 16 and 17 in the normal braking mode and in a braking mode undergoing an anti-lock control. This causes both rear-wheel brakes 16 and 17 to be regulated to the same brake pressure during ABS control. At the same time, brake-pressure reduction phases are achieved because the ABS outlet valve 71, connected between the left rear-wheel brake and the return line 73 (or the buffer accumulator 74) and the inlet non-return valve 76 of the return pump 34 of the rear-axle brake circuit II, is switched into its throughflow position I, while the inlet valves 64 and 66 are simultaneously changed over to their shut-off positions I. Brake-pressure holding phases are obtained by switching the ABS outlet valve 71 back into its shut-off position 0, while the inlet valve 64 and 66 assume their shut-off positions I and while pressure build-up phases of the anti-lock control can be controlled by switching at least one of the inlet valves 64 and/or 66 back into its throughflow position 0 while the electrically activatable outlet valve 71 is still in its basic shut-off position 0.

Where the drive-slip control mode is concerned, the exemplary embodiment according to FIG. 2 is entirely similar to that according to FIG. 1.

As indicated by broken lines, instead of the mechanically activatable outlet valve 72', there can be a hydraulically activatable outlet valve 72" which is connected between the two rear-wheel brakes 16 and 17 controlled by means of the outlet pressure generated in the secondary outlet-pressure space of the brake unit 18 (during the actuation of the latter) and which is therefore entirely similar in functional terms to the mechanically activated outlet valve 72' illustrated.

In a further alternative version of the exemplary embodiment according to FIG. 2, the outlet valve 72''' is designed (as represented by broken lines) as a valve controlled by the outlet pressure of the precharging pump 81. Functional positions of such a pressure-controlled valve being complimentary to that previously discussed in that the basic position 0 of the outlet valve 72" controlled by brake pressure is its shut-off position, while the basic position 0 of the outlet valve 72''' activated by the outlet pressure of the precharging pump 81 is its throughflow position.

Instead of utilizing a precharging pump 81 with its own electrical drive, one can use a further piston pump 81' (FIG. 3) which is driven by the eccentric drive 36 of the two return pumps 33 and 34 and in which the piston 124 thereof is constantly held against the circumferential surface of the driving eccentric by means of a spring 127. The inlet valve 128 of such a pump can be designed so that it is open when the pump piston 124 executes its suction stroke leading away from the inlet port of the pump chamber (during the last phase of this suction function and in the initial phase of the subsequent deliver stroke) and otherwise (as a result of the sealing bearing of its valve body against a valve seat 132 surrounding the inlet port) shuts off a pressureless brake-fluid line leading from the brake-fluid reservoir 79, 91 to the precharging pump 81'. An inlet valve of this type can be produced by connecting its valve body to the further pump piston 124 via a short helical spring 129, the length of which in the relaxed state is calculated so that the valve body is lifted off from the valve seat beyond a minimum distance of the piston from the inlet port of the pump chamber corresponding to a predominant part of the piston stroke. This will allow brake fluid to flow unimpeded into the pump chamber, and after a short initial portion of the pressure build-up stroke of the piston, the inlet valve will assume its shut-off position once again.

Figure 3:
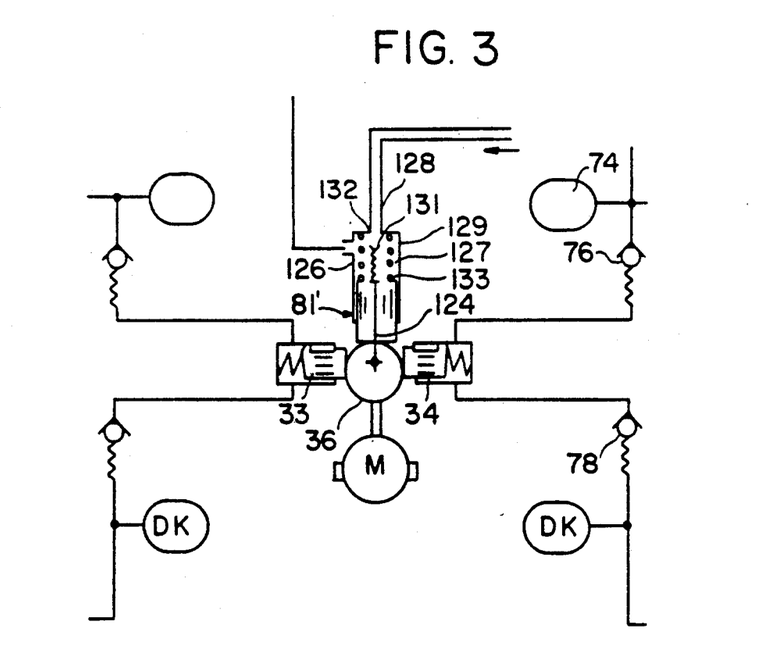
FIG. 3 shows a modified form of a precharging pump.

A precharging pump can be omitted if the return pump 34 of the rear-axle brake circuit II is designed as a so called self-priming pump with a pump spring which constantly keeps the pump piston 35 bearing slidably against the surface of the eccentric drive.

In order to ensure the detection of a leak in the brake circuit II of the driven vehicle wheels, especially a leak of the inlet circuit of the return pump 34 utilized as a pressure source of the ASR, there can be an automatically working indicator device 150 (FIG. 4) which detects an incongruity between the brake pedal-actuating force $K_P$ and the pedal travel and which generates a malfunction indication from this. A device of this type can be obtained by providing an electronic or electromechanical sensor 156 which generates an electrical output signal characteristic of the brake pressure in the brake circuit II of the driven vehicle wheels and a likewise electronic or electromagnetic displacement or position transmitter 152 monitoring the position of that brake-unit piston 31. The output signals 150, 160 of these sensors of the pressure and the piston position would be subject to a comparison with values of the corresponding parameters characteristic of a proper function of the brake system 10 by a fault detector evaluation unit 154 and in the event of a malfunction of the brake system an acoustic or optical indicator signal 162 characteristic of this is generated as a result of this comparison and is fed to an indicator 150.

Figure 4:
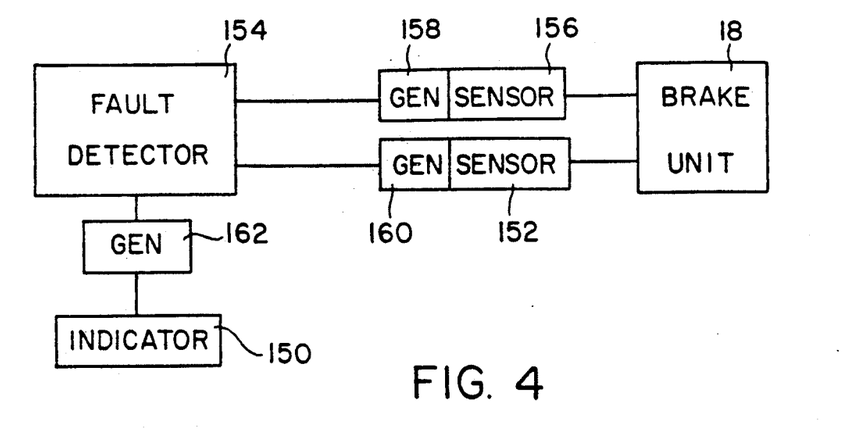
FIG. 4 shows a schematic of a fault detection system to be used with the ASR control.

Electrical output signals suitable for a malfunction detection of this kind can also be generated by means of two displacement or position transmitters which each individually detect the positions of the primary and the secondary piston of the tandem master cylinder brake unit 18. A malfunction would be detectable from the fact that the pairs of values of the piston positions obtainable from the output signals of such sensors do not correspond to the paris of values which are characteristic of various brakes forces or brake pressures stored in an electronic evaluation unit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A drive-slip control (ASR) for a wheel brake system of a road vehicle having driving and driven wheels and equipped with an anti-lock system (ABS) and having a hydraulic dual-circuit static brake system, in which one static brake circuit is assigned to the driving vehicle wheels and another static brake circuit to the driven vehicle wheels and which two brake circuits are each connected to a respective outlet-pressure space of a brake unit provided for brake actuation;

wherein at least on the brake circuit (II) of the driven vehicle wheels, the ABS works on the return-flow principle wherein during pressure-reduction phases of the anti-lock control, a quantity of brake fluid, corresponding to a quantity of brake fluid flowing off from the wheel brake(s) undergoing the ABS control, is fed into a return line connected to a buffer accumulator and is pumped back into the brake unit by a return pump means which has an inlet side connected to the buffer accumulator and an outlet side connected to the brake unit;

wherein the ASR works on the principle of decelerating a vehicle wheel tending to spin by subjecting its wheel brake to pressure from an auxiliary-pressure source so that its drive slip remains within a value range compatible with a sufficient dynamic stability of the vehicle;

wherein for the drive-slip control mode, the return pump means of the ABS, returning brake fluid from the brake circuit of the driven vehicle wheels, is utilized as the auxiliary-pressure source from which pressure is supplied to the wheel brake(s) is pressure build-up phases;

wherein there is an ASR control valve means which can be changed over from a basic position, said basic position being a valve position in which brake fluid can be positively displaced into the wheel-brake cylinders of the brakes of the driven vehicle wheels as a result of the actuation of the brake unit during a normal braking mode, into an alternative functional position, said alternative functional position being a valve position in which brake fluid is prevented from flowing off from the main brake line of the brake circuit of the driven vehicle wheels towards the respective outlet-pressure space of the brake unit;

wherein a supply flow path leads from a brake fluid reservoir of the brake unit through a piston of the brake unit and a delivery outlet of the pressure space of the brake unit to the inlet of the return pump means; and wherein an inlet control valve is connected in the supply path between the delivery outlet and the inlet of the return line of the brake circuit and which is changed over from a basic position assigned to a braking mode to a functional position assigned to the ASR mode for the duration of control cycles of the drive-slip control.

2. A drive slip ASR control according to claim 1, wherein the inlet control valve is designed as an electrically activatable 2/2-way solenoid valve with the basic position being a shut-off position and the functional position a throughflow position wherein.

3. A drive slip ASR control according to claim 1, wherein the inlet control valve is designed as a mechanically controlled valve which is changed over from its throughflow position assigned as a basic position of the drive-slip control mode into its shut-off functional position assigned to the braking mode as a result of an actuation of the brake unit.

4. A drive slip ASR control according to claim 3, wherein the inlet control valve can be changed over from the throughflow position assigned to the drive-slip control mode into the shutoff position assigned to the braking mode as a result of the displacement of the piston of the brake unit, said piston movably limiting the outlet-pressure space of the brake unit assigned to the brake circuit of the driven vehicle wheels during actuation of the brake unit; and wherein this change-over takes place within a small fraction of a possible total stroke of the brake-unit piston utilized for actuating the inlet control valve.

5. A drive slip ASR control according to claim 1 wherein there are two electrically activatable 2/2-way solenoid outlet valve means which control brake fluid flow off from wheel brake(s) of the brake circuit of the driven vehicle wheel into the return line during pressure-reduction phases of the anti-lock control;

wherein the two outlet valve means each have a shut-off position 0 during normal braking mode not undergoing an anti-lock control and during drive-slip control mode; and wherein the two outlet valve means have a throughflow position connecting the wheel brake(s) of the driven brake circuit to the return line in pressure-reduction phases of the anti-lock control.

6. A drive slip ASR control according to claim 5, wherein one outlet valve means of the two outlet valve means can be moved to a position to shut-off one of the wheel brakes of the driven vehicle wheels from the other and from the return line of their brake circuit in the drive slip control mode;

wherein this one valve means can connect these two wheel brakes to one another, at least in the anti-lock control mode; and wherein the other outlet valve means of the two outlet valve means can jointly shutoff both wheel brakes from the return line.

7. A drive slip ASR control according to claim 6, wherein the one outlet valve means is designed as a hydraulically activatable valve which is actuated by pressure built up in the outlet pressure space assigned to the brake circuit of the driven vehicle wheels during the actuation of the brake unit; and wherein this one outlet valve means is changed from its shut-off basic position into its throughflow position by the built up pressure upon a actuation of the brake unit.

8. A drive slip ASR control according to claim 6 wherein the one outlet valve means is designed as a mechanically controlled 2/2-way valve which is changed over from a basic shutoff drive-slip control mode position into a throughflow position assigned to the braking mode as a result of the actuation of the brake unit.

9. A drive slip ASR control according to claim 8 wherein the one outlet valve means is actuated by one of a brake-unit tandem piston which movably limits the secondary outlet-pressure space of the brake unit assigned to the brake circuit of the driven vehicle wheels; and wherein the change-over takes place within a small fraction of the possible total stroke of the brake-unit tandem piston.

10. A drive slip ASR control according to claim 6 wherein the one outlet valve means is designed as a 2/2-way valve which is activatable by means of outlet pressure of a precharging pump to change over from a basic throughflow position into functional shut-off position during the drive-slip control mode.

11. A drive slip ASR control according to claim 10, wherein the precharging pump is designed as a gear pump.

12. A drive slip ASR control according to claim 1 wherein there is a precharging pump to feed pressure to the buffer accumulator and return pump means; and wherein said precharging pump is a further piston pump which is driven by a pump drive provided for the return pump means.

13. A drive slip ASR control according to claim 12, wherein the precharging pump is designed as a self-priming pump.

14. A drive slip ASR control according to claim 13, wherein the precharging pump is equipped with a displacement-controlled inlet valve which is moved into an open position while the pump piston is executing a final portion of its suction stroke and the initial portion of its delivery stroke; and wherein the inlet valve is otherwise shutoff.

15. A drive slip ASR control according to claim 1, wherein the return pump means of the brake circuit of the driven vehicle wheel is designed as a self-priming pump.

16. A drive slip ASR control according to claim 1, wherein the ASR control valve is connected between a main brake line of driven wheel brakes and the brake unit.

17. A drive slip ASR control according to claim 1, wherein there is a fault detection means which generates an indicator signal characteristic of the proper functioning or malfunctioning of the brake system as a result of a comparing of a first sensor output signal, which is a measure of the displacement of the piston brake unit occurring as a result of an actuation of the brake system, with a second sensor output signal, which is a measure of the brake-actuating force arising as a result of brake actuation.

18. A drive slip ASR control according to claim 17, wherein the second sensor output signal is generated by a pressure sensor output signal that is generated by a pressure sensor which monitors the brake pressure occurring in one of the brake circuits of the driven vehicle wheels.

19. A drive slip ASR control according to claim 1, wherein the brake unit is designed as a tandem master cylinder;
   wherein there is fault detection means which comprises two displacement sensor each monitoring the position of one of the two pistons of the tandem master cylinder and generating electrical output signals characteristic of the piston positions; and
   wherein the fault detection means generates an indicator or warning signal characteristic of the proper function or malfunctioning of the brake system as a result of a comparative processing of these output signals.

* * * * *